US006837334B1

(12) United States Patent
Le Prevost

(10) Patent No.: US 6,837,334 B1
(45) Date of Patent: Jan. 4, 2005

(54) ACOUSTIC HORN

(76) Inventor: Dominic Le Prevost, Tanyard Farm, Lower Wear, Nr Axbridge, Somerset (GB), BS26 2JG ( * ) Notice: Subject to any disclaimer, the term of this patent is extended or adjusted under 35 U.S.C. 154(b) by 0 days.

(21) Appl. No.: 09/647,026

(22) PCT Filed: Mar. 25, 1999

(86) PCT No.: PCT/GB99/00938

§ 371 (c)(1),
(2), (4) Date: Nov. 6, 2000

(87) PCT Pub. No.: WO99/50823

PCT Pub. Date: Oct. 7, 1999

(30) Foreign Application Priority Data

Mar. 27, 1998 (GB) ............................................ 9806713
Aug. 26, 1998 (GB) ............................................ 9818642
Oct. 27, 1998 (GB) ............................................ 9823529

(51) Int. Cl.[7] ............................................ G01K 11/00
(52) U.S. Cl. ...................................... 181/177; 181/192
(58) Field of Search ................................ 181/177, 176, 181/178, 179, 182, 184, 186, 188, 192, 193, 194, 175

(56) References Cited

U.S. PATENT DOCUMENTS 1,029,502 A * 6/1912 Landon ...................... 181/178
1,158,871 A * 11/1915 Tomlin ....................... 138/166
1,353,864 A * 9/1920 Thomassian ................ 446/209
1,403,314 A * 1/1922 Gerson ....................... 181/178
1,613,001 A * 1/1927 Wilhelm ..................... 181/178
1,920,631 A * 8/1933 Coumbopoilos ............ 181/178
2,507,843 A * 5/1950 Wheeler ..................... 181/178
4,166,565 A * 9/1979 Webinger ................... 229/120
4,329,905 A * 5/1982 Lloyd ........................ 84/411 R
4,703,829 A * 11/1987 Hardt ......................... 181/178
4,764,145 A * 8/1988 Kirby ......................... 446/202
5,094,317 A * 3/1992 Ladendorf .................. 181/178
5,631,450 A * 5/1997 Itakura ....................... 181/182
5,726,396 A * 3/1998 Erath ......................... 116/140
5,967,405 A * 10/1999 Hanauska ................... 181/178

FOREIGN PATENT DOCUMENTS

DE 2040787 2/1972
FR 1066361 6/1954
FR 2763736 11/1998
FR 319520 3/2002
GB 519577 4/1940

OTHER PUBLICATIONS

British Registered Design 2084150—Dominic Le Prevost—“Noise Maker” filed May 14, 1999 Registered Aug. 16, 1999.

* cited by examiner

*Primary Examiner*—Kimberly Lockett
(74) *Attorney, Agent, or Firm*—Ladas & Parry

(57) ABSTRACT

A folded structure (and a blank of sheet material) capable of being folded to said structure is provided which structure is an acoustic horn comprising an acoustic horn comprising a tapered structure having a base end and an apex end, the tapered structure being formed from a sheet of foldable material, and comprising a wall member having a plurality of fold lines defining the edges of a plurality of juxtaposed panels, characterised in that at least two of the fold lines (73, 74) are arcuate to form a non-planar panel (55) bound by said arcuate fold lines both base end (51) and apex end (52) being open. The structure provides an inexpensive party product which can easily be shaped in flat form but provides pleasing acoustical properties.

17 Claims, 12 Drawing Sheets

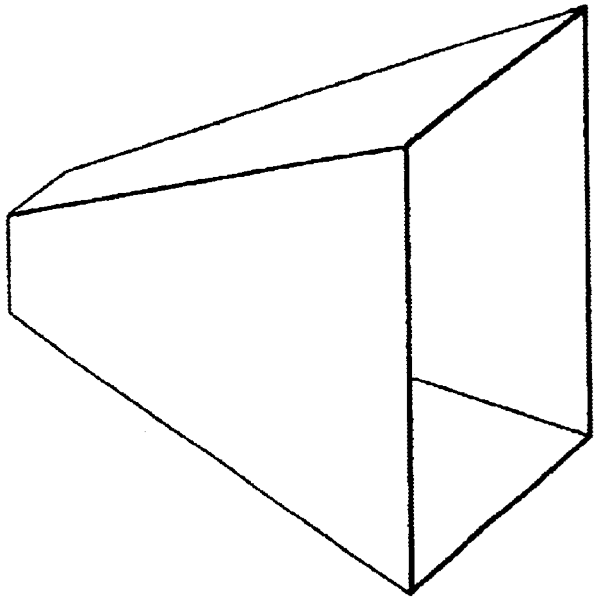
FIG. 1
FIG. 2
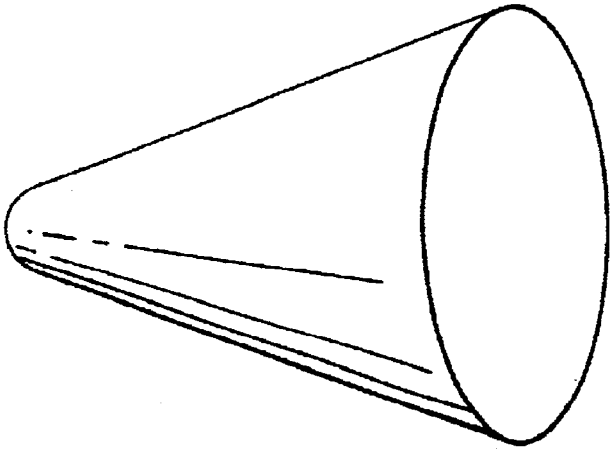
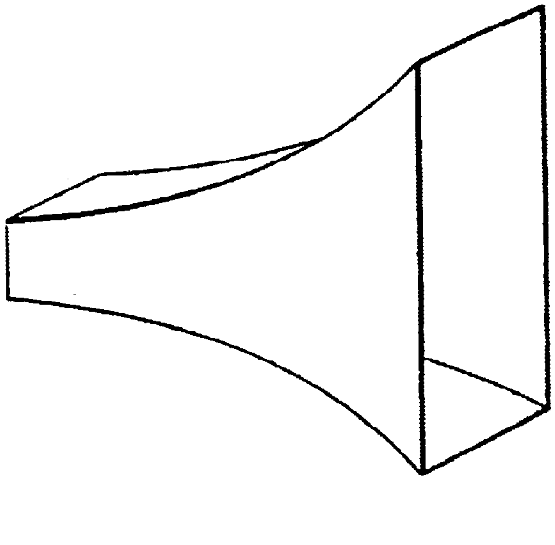
FIG. 3

ACOUSTIC HORN

This invention relates to an acoustic horn which, amongst other things, may be used as a musical instrument. Such a structure can be formed from a sheet of foldable material. The invention also relates to a blank of foldable sheet material for forming the tapered structure.

In the field of acoustics, horns are generally classified according to their geometrical shape. FIG. 1 shows for example, a pyramidal horn with an open rectangular base, and a tubular wall comprising four planar trapezoidal shaped panels. The apex of the pyramid is truncated to form a throat section through which acoustic energy may be transmitted or received.

FIG. 2 shows a conical horn in which the tubular wall forms a continuous panel circumscribing an acoustic channel within. The geometrical structures shown in FIGS. 1 and 2 are characterised by their cross-sectional area increasing linearly with the distance from their throat. These structures, by virtue of their shape, may be formed from a single sheet of foldable material. The blank for the pyramidal horn is shown in FIG. 4, with the four panels labelled 41, three fold lines labelled 42, and a tab for holding the structure together labelled 43.

FIG. 3 shows a sectoral horn in which one of the sets of two opposing panels are planar and parallel, and the other set of opposing panels are flared. This particular structure is characterised by the cross-sectional area increasing non-linearly with the distance from the throat. This non-linearity of the cross-sectional area improves the efficiency of the horn structure in channelling acoustic energy to or from the throat. However, whereas the shape of the structures of FIGS. 1 and 2 enable them to be formed from a sheet of foldable material, the geometrical structure of FIG. 3 must be formed by fastening together the separate panels. French Patents FR-A-2763736 (published Nov. 27, 1998), FR-A-319520 and U.S. Pat. No. 1,353,864 disclose conical horns as illustrated in FIG. 2 of the present application.

German Patent DE-A-2040787 discloses a generally conical trumpet with panel structure but no arcuate structure. UK Patent GB-A-519577 discloses a container structure with non planar elements but not an acoustic structure or arcuate features. French Patent FR-A-1066361 discloses a carton with arced panels but not an acoustic horn. U.S. Pat. No. 4,166,565 discloses a carton with a arcuate panel but with sealed ends and there is no disclosure of acoustic properties.

According to a first aspect of the present invention there is provided an acoustic horn comprising a tapered structure having a base end and an apex end, the tapered structure being formed from a sheet of foldable material, and comprising a wall member having a plurality of fold lines defining the edges of a plurality or juxtaposed panels, characterised in that at least two of the fold lines are arcuate to form a non-planar panel bound by said arcuate fold lines both base end and apex end being open.

A structure in accordance with the present invention has an advantage that it by using curved fold lines instead of straight fold lines as used in the pyramidal horn, a panel or panels of the structure may be made non-planar. The use of curved interfaces between adjacent panels enhances the strength of the structure, in particular its ability to withstand sheering and crushing forces.

The structure has a base end and an apex end, also referred to as the mouth and the throat respectively. Both of these ends must be open to provide an acoustic horn.

Specifically an internal channel is provided to enhance the acoustic properties.

In a preferred embodiment, at least one pair of the curved fold lines converge towards the apex end, and may contribute to the general convergence of the tapered structure i.e. the decrease in the cross-sectional area towards the throat.

Preferably at least one pair of the curved fold lines converges towards the base end of the tubular wall. In this case, the curved fold lines may converge to a point at or near the base end.

Ideally, at least one non-planar panel has a concave external appearance, and has mirror symmetry in a plane substantially perpendicular to the panel.

Advantageously, the wall member may include a second non-planar panel, opposite the first non-planar panel, and also having a concave external appearance. The first and second panels may be of different size and one or both may stop short of the base. Advantageously fold lines may be disposed in the non-planar panels, thereby allowing the tapered structure to be folded flat. This is advantageous for transport and storage.

The wall member may include two further opposing non-planar panels, joining the first and second non-planar panels, and having a generally convex external appearance.

A preferred embodiment of the invention has first and second non-planar panels which are generally elliptically shaped. Alternatively, the first and second non-planar panels may be regarded as being generally petal shaped. In a further embodiment, the first and second non-planar panels may be regarded as being generally trapezoidal shaped with the non-parallel sides being curved.

The acoustic horn may advantageously have a cross-sectional area which varies non-linearly (generally increasing) with the distance from the throat.

An internal channel may be formed within the horn. The channel may carry a vibrating element. It is thus possible to form a kazoo within the horn.

Preferably the channel is integrally formed with the horn. The channel may be formed by folding a portion of the sheet of foldable material.

Advantageously at least one orifice or notch may be cut into a wall of the internal channel in order to support the vibrating element. The vibrating element may, for example, be formed from a thin paper, plastics or metal sheet and which can be forced into vibration when a user modulates a flow of air into the horn with their own vocal cords. In a preferred embodiment the foldable material is laminated and the laminating material extends over the orifice or notch to form the vibrating element. A tab can be left in the material of the orifice and removed prior to final assembly.

Advantageously a single line of adhesion may be provided for glue and/or sticky tape such that the tapered structure can be formed from the unfolded blank of material in a relatively easy folding operation. Advantageously the line of adhesion is a straight line.

According to a second aspect of the present invention, there is provided a tapered structure comprising at least first, second and third wall portions, wherein the wall portions co-operate in use, to form a channel, and wherein the second portion is intermediate the first and third portion, is bounded by two arcuate curves, and has an outwardly concave surface.

According to a third aspect of the present invention there is provided a sheet of material having three pairs of fold lines formed therein, wherein each pair of fold lines are arcuate and serve to define five portions, and in which the lines in each pair curve so as to define three tongue shaped portions, separated by intervening regions.

The present invention will further be described, by way of example, with reference to the accompanying drawings, in which:

FIGS. 1 to 4 are illustrative of the acoustic devices of the art.

FIG. 1 is a perspective view of a pyramidal horn;

FIG. 2 is a perspective view of a conical horn.

FIG. 3 is a perspective view of a sectoral horn.

FIG. 4 is a plan view of a blank for the pyramidal horn of FIG. 1.

Figure 6:
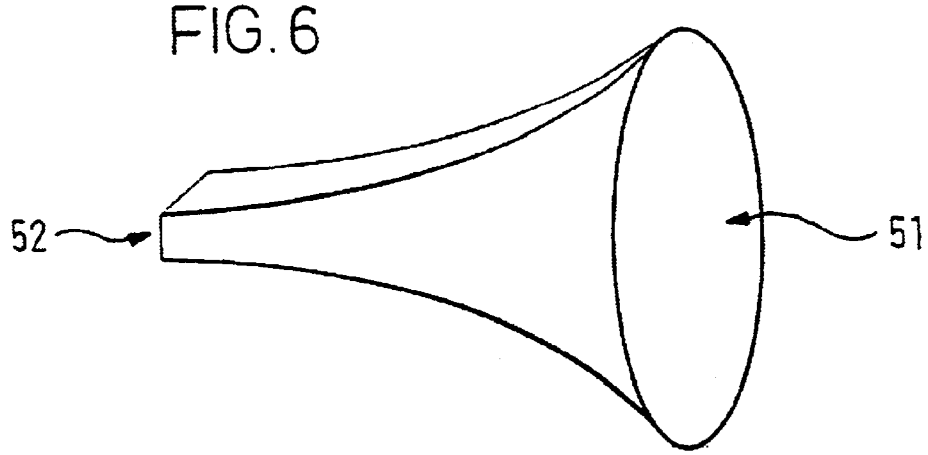
Figure 7:
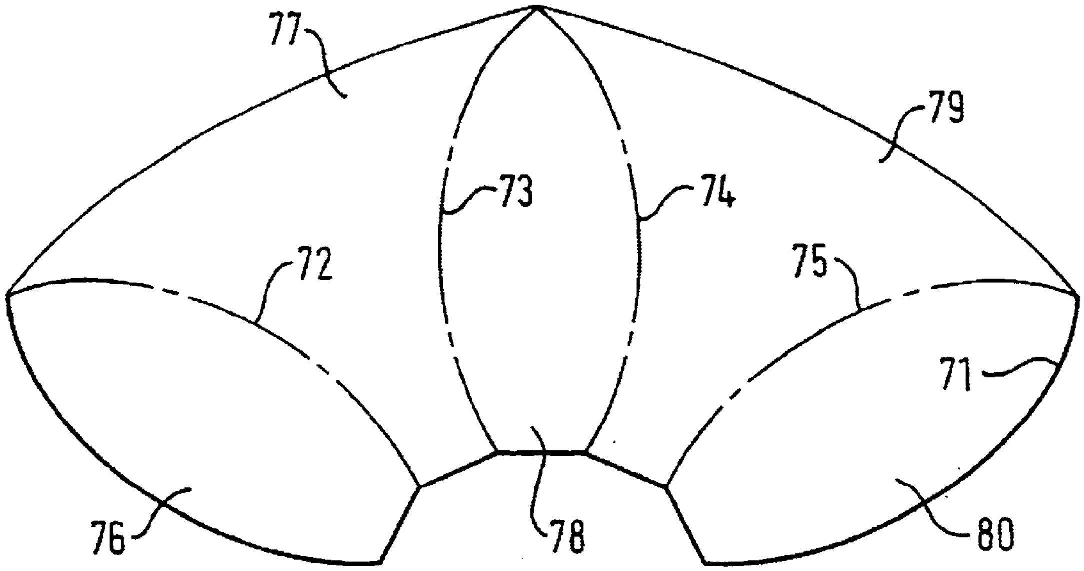
Figure 8:
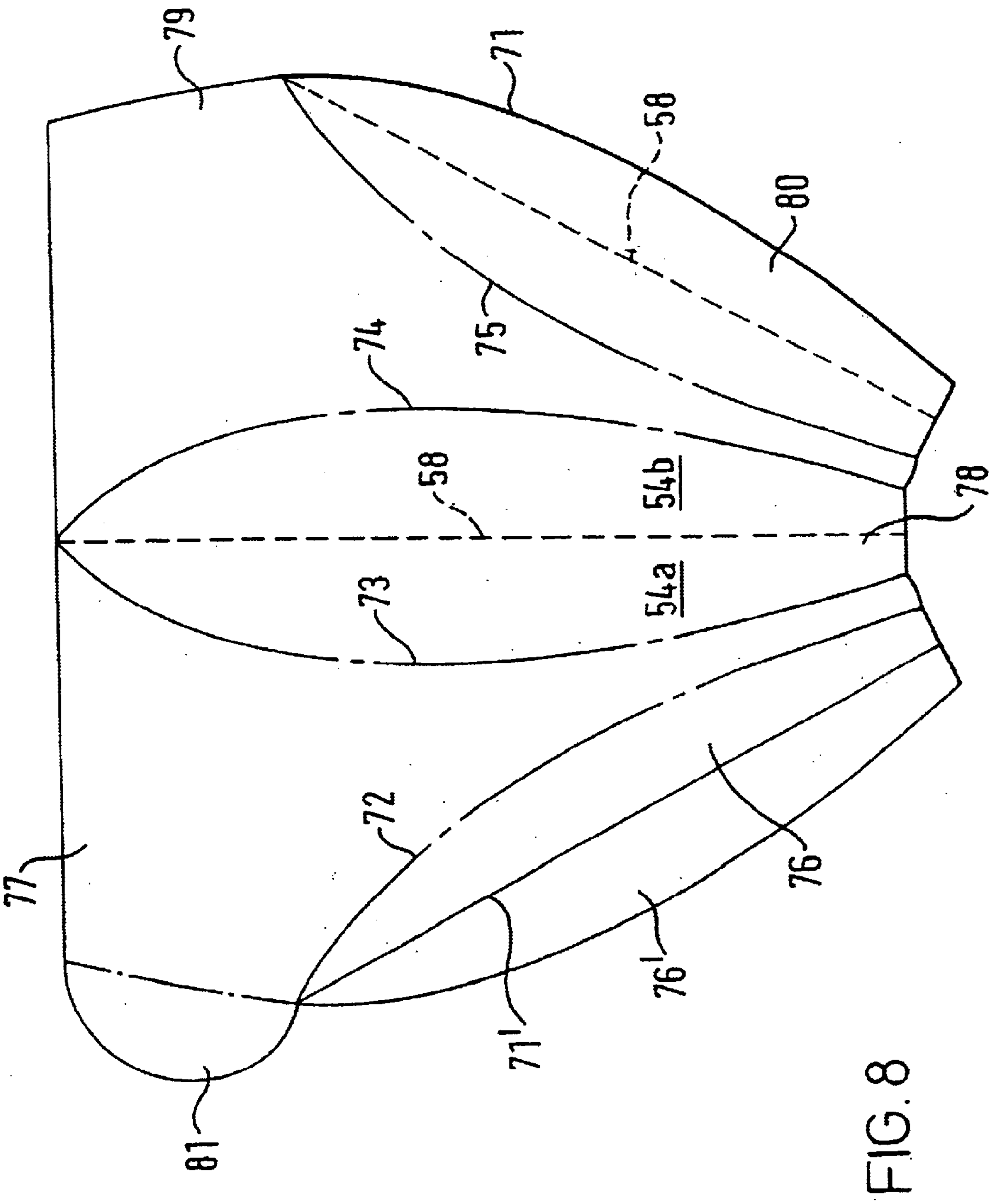

FIGS. 5*a*, 5*b*, 5*c* and 5*d* are views of a first embodiment of a tapered structure in accordance with the invention in various orientations;

FIG. 6 is a perspective view of a second embodiment of a tapered structure in accordance with the invention;

FIG. 7 is a plan view of a blank for the tapered structure of FIG. 6;

FIG. 8 is a plan view of a blank for the tapered structure of FIGS. 5*a*, 5*b*, 5*c* and 5*d;*

Figure 9A:
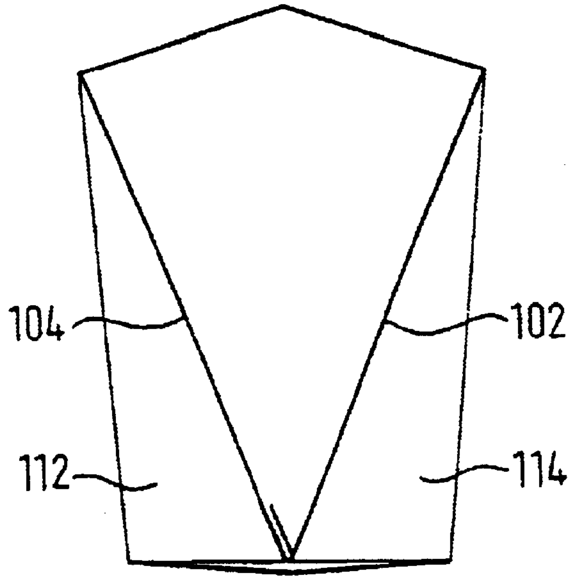
Figure 9B:
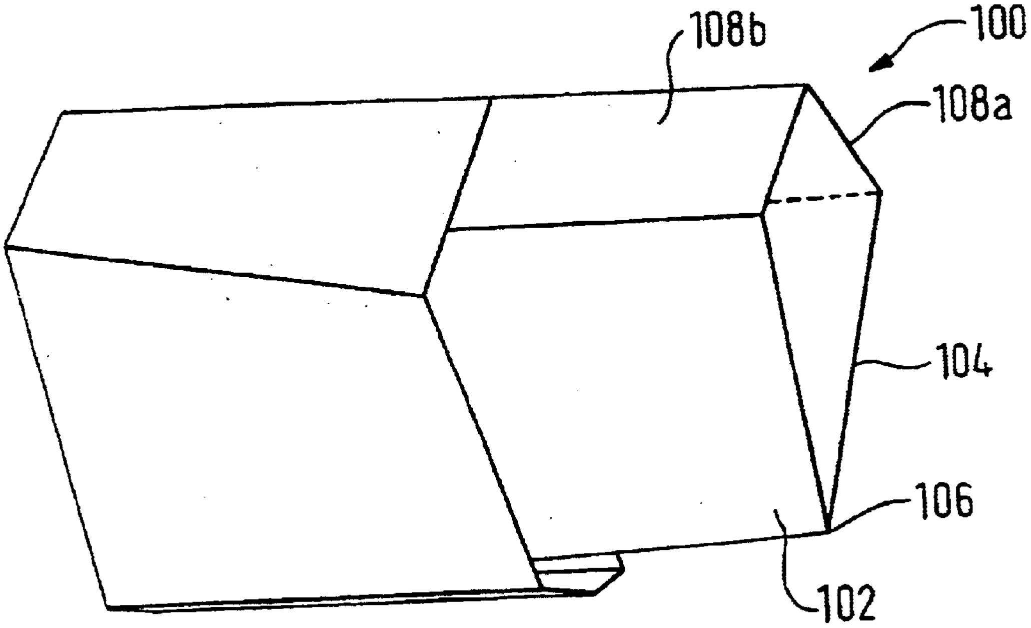

FIGS. 9*a* and 9*b* are end and exploded views of the throat of a tapered structure constituting a third embodiment of the invention.

Figure 10:
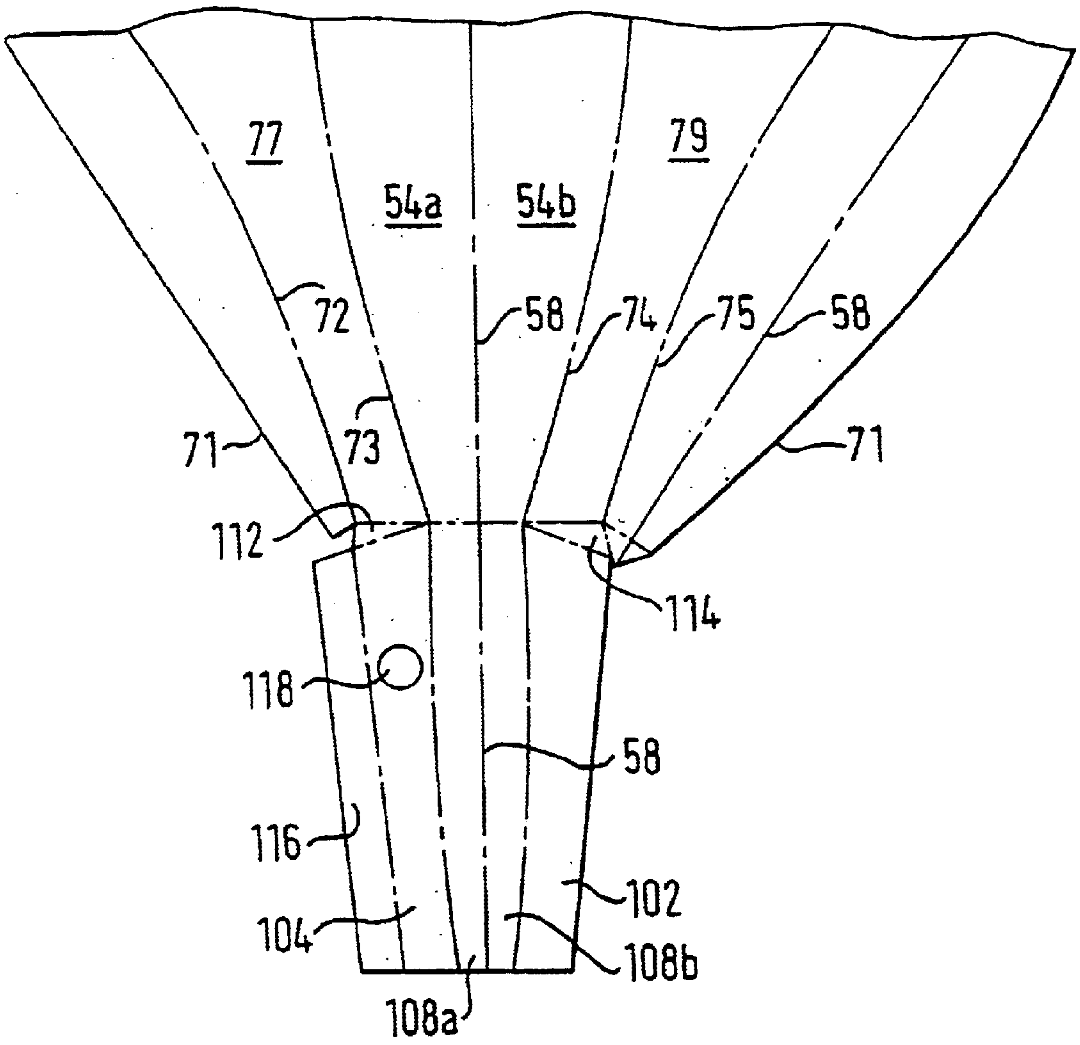

FIG. 10 shows part of the blank for the tapered structure of FIGS. 9*a* and 9*b;*

Figure 11:
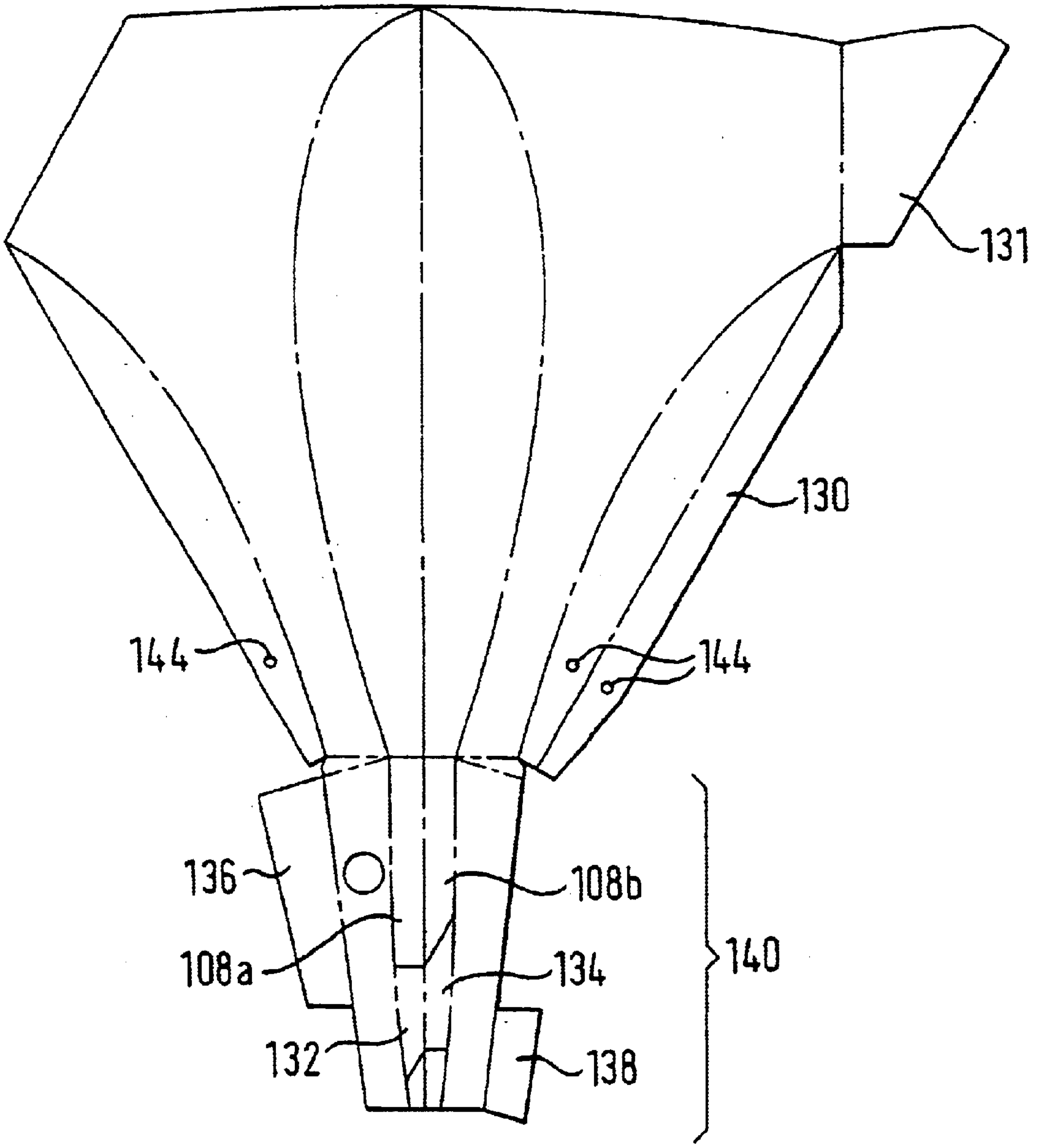
Figure 12:
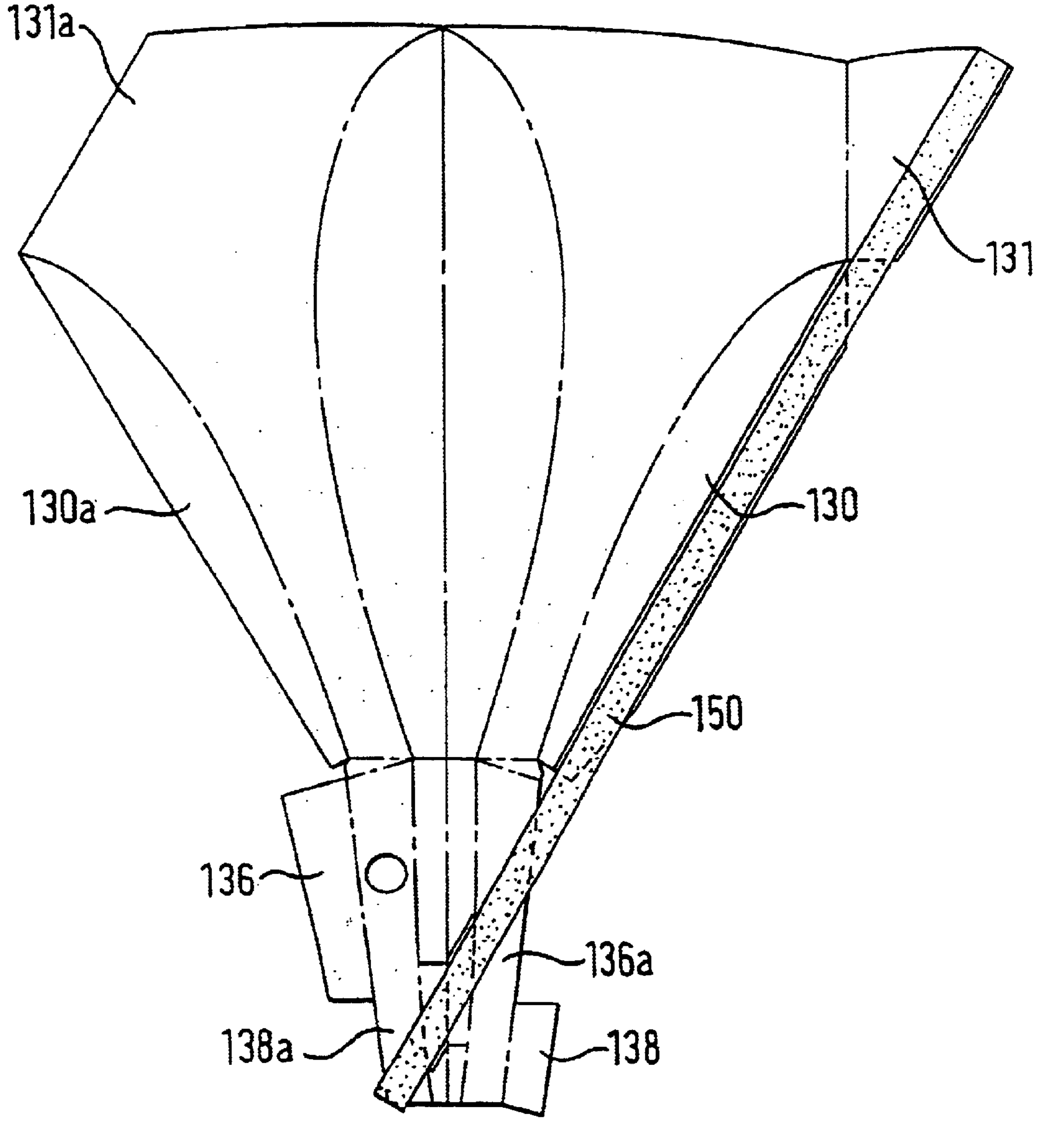
Figure 13:
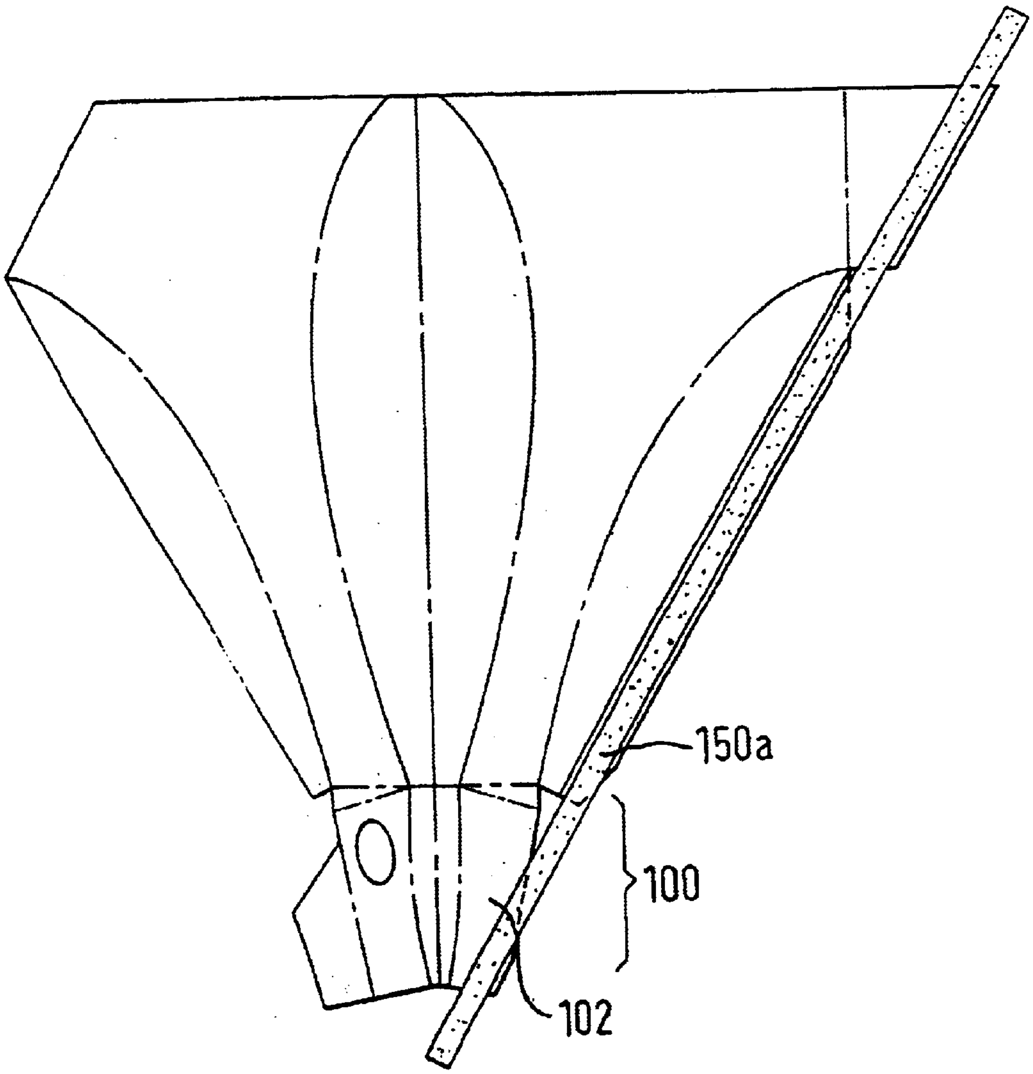
Figure 14:
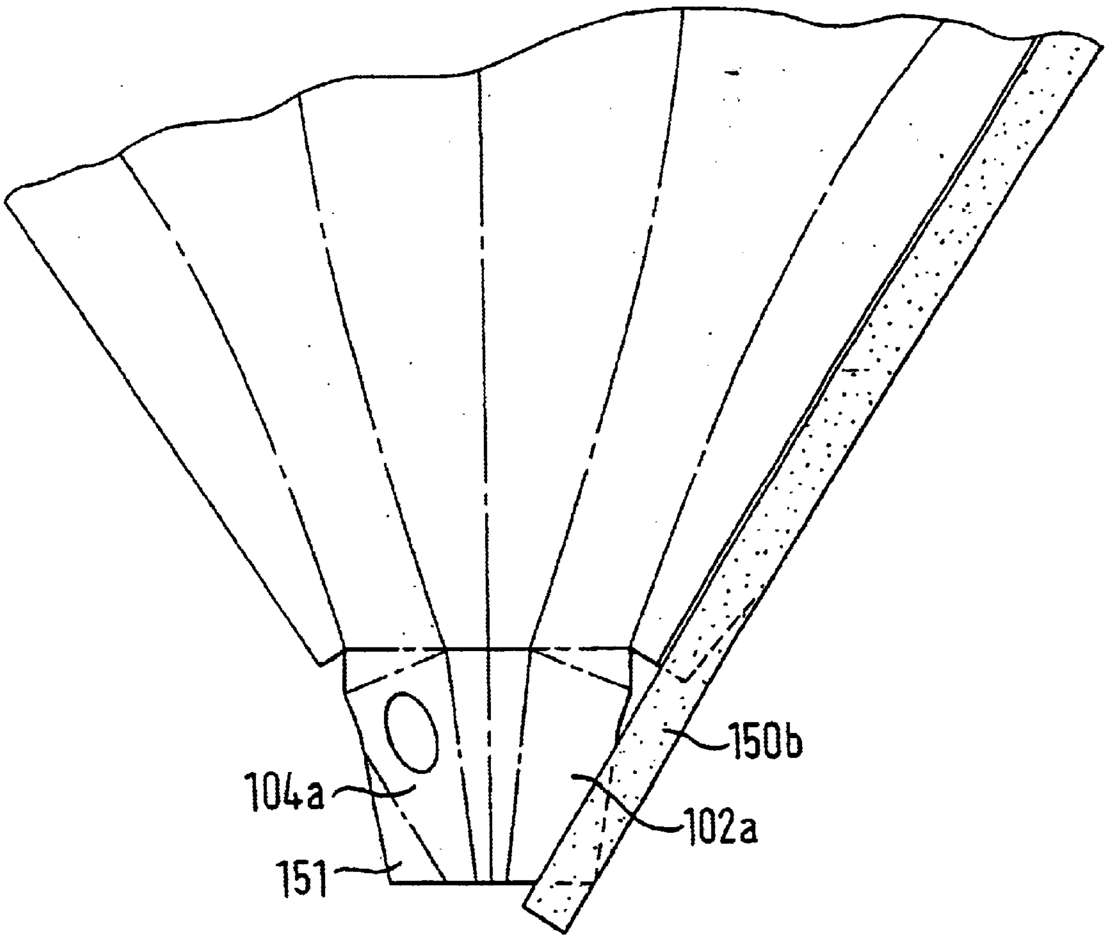
Figure 15:
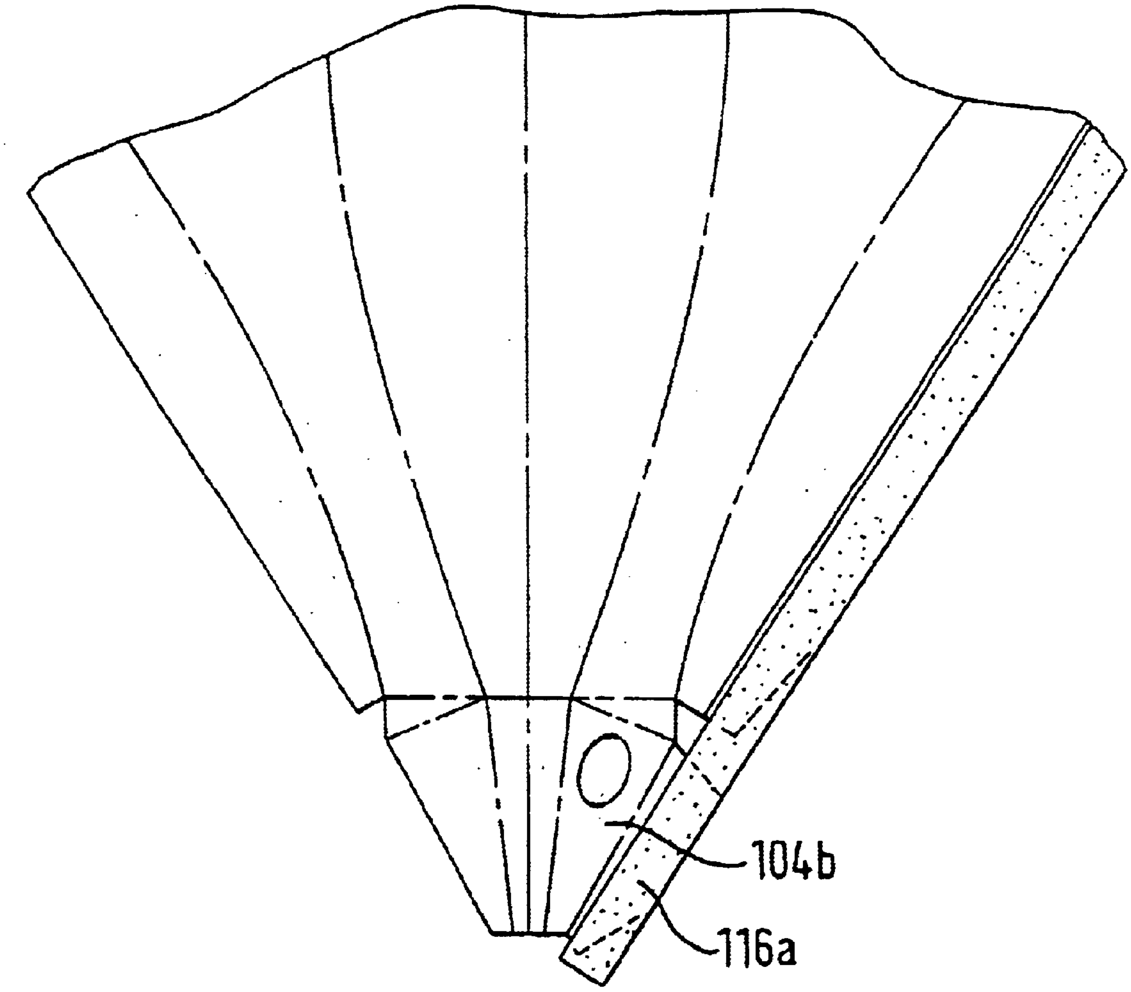

FIG. 11 illustrates a blank for a fourth embodiment of the invention having a modified panel shape so as to define a linear line of adhesions;

FIG. 12 illustrates a blank of FIG. 11 with a linear glue line in place;

FIG. 13 illustrates a blank for a fifth embodiment of the invention, having a linear line of adhesion along one edge of the blank, with a glue line in place along the line of adhesion;

FIG. 14 illustrates a portion of the blank for a modified version of the internal channel structure; and FIG. 15 illustrates a variation of the embodiment of FIG. 13 viewed from the other side of the blank.

Figure 4:
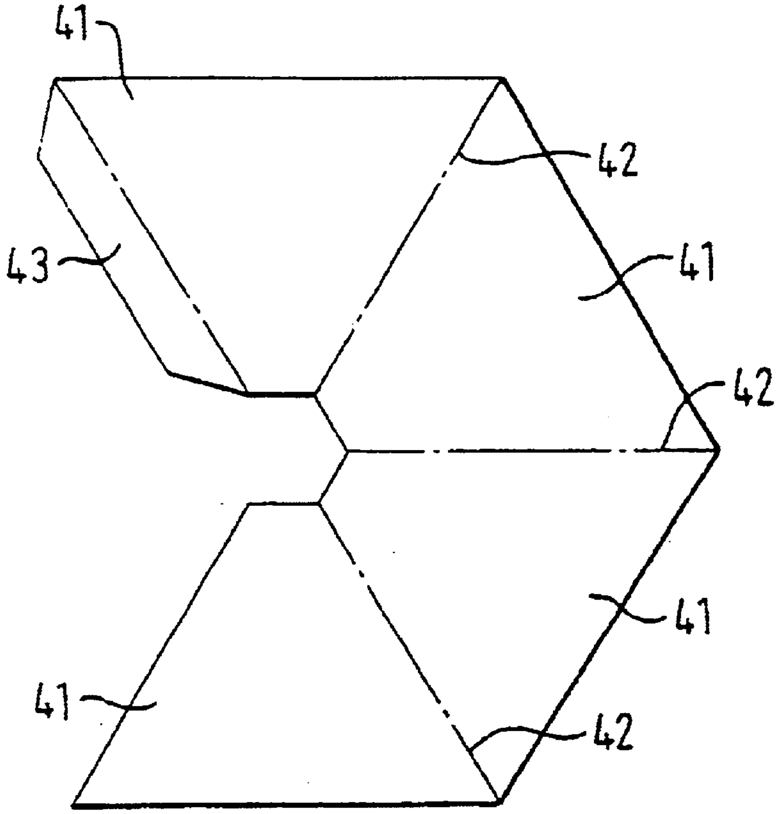
Figure 5A:
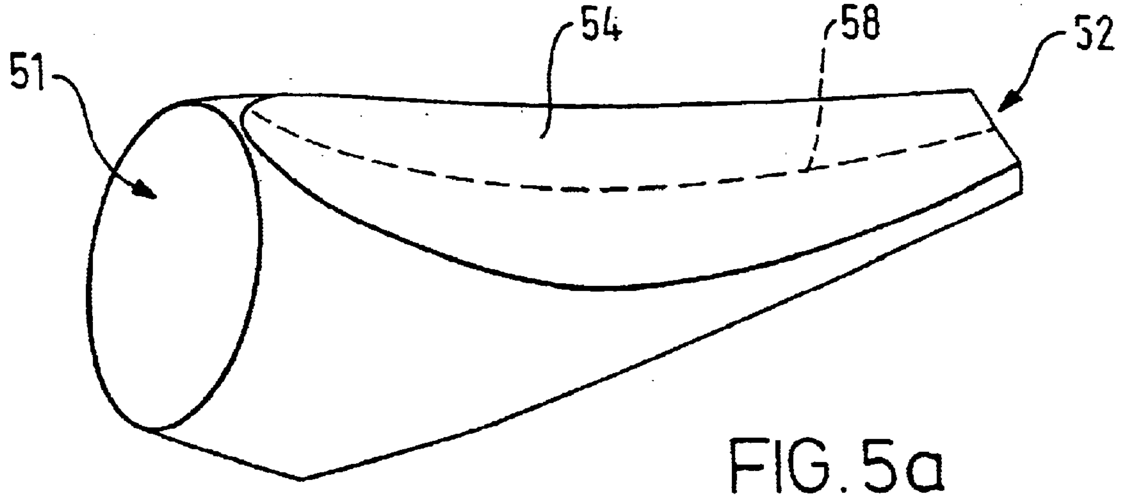
Figure 5B:
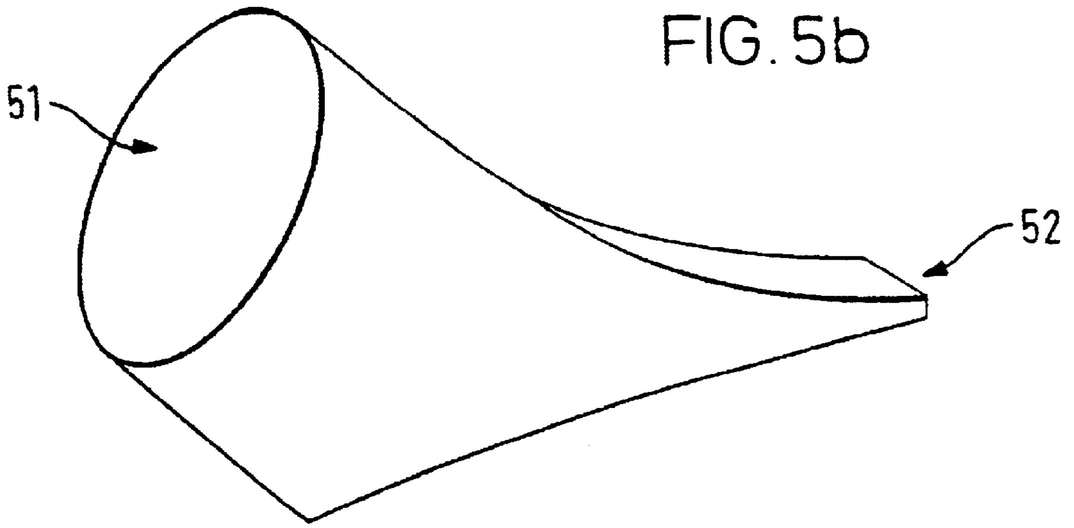
Figure 5C:
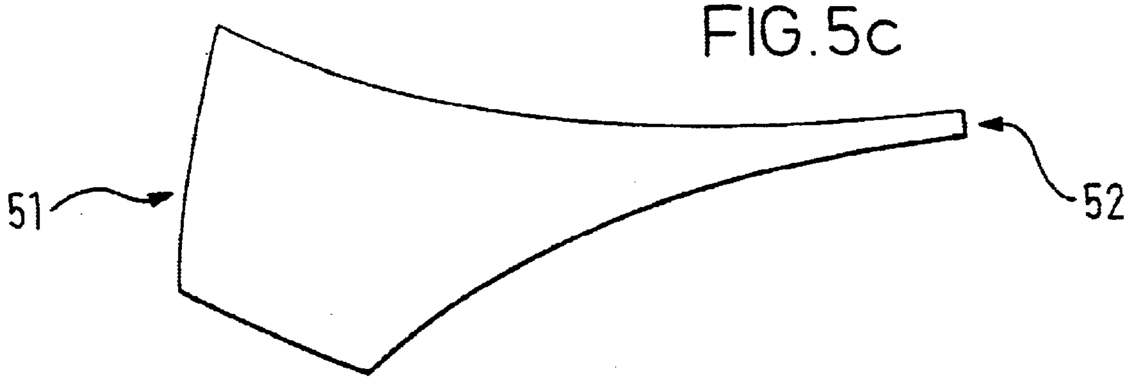
Figure 5D:
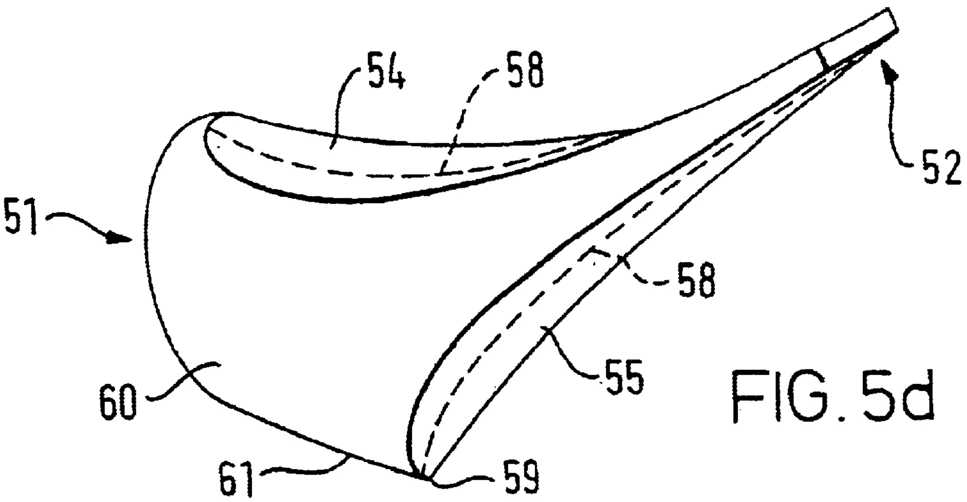

Referring to FIGS. 5*a,* 5*b,* 5*c* and 5*d* there is shown a horn structure which is formed by folding a sheet of material. The material may be any foldable material, such as paper, card, suitably thin sheet metal, or plastics.

The horn structure has a single wall which is wrapped around a channel or cavity, and joins back onto itself to form a hollow tube-like structure. The horn has an open base end 51, known as the mouth, having a relatively wide cross-sectional area. The cross-sectional area of the channel decreases along the length of the horn, at least from pyramidal region 59, to an open truncated apex end 52, otherwise known as the throat of the horn. The horn has first and second opposed concave surfaces 54 and 55, respectively. Each surface 54 and 55 is provided with respective longitudinally extending fold lines, as indicated by the chain lines 58. Thus the surface 54 is divided into portions 54*a* and 54*b* (see FIG. 8). The first concave surface 54 extends from the throat 52 to the mouth 51 of the horn. The second concave surface 55 only extends part of the way towards the mouth 51. This results in the creation of the pyramidal region 59 where the second concave surface and the opposed side walls 60 and 61 come together. This pyramidal region imparts structural stability into the horn.

The horn can be moved between a flat and a 3-dimensional state at will. This does involve some stressing of the material of the horn, which "clicks" into its final state as the horn is constructed from the flat to the 3-dimensional form. This sudden change into the final 3-dimensional state also enhances the structural rigidity of the horn and inhibits the horn from inadvertently returning to the flat state. Of course, the horn may be provided without the fold lines 58 if it is not to be folded flat.

Referring also to FIG. 8, there is shown a blank for the horn structure of FIGS. 5*a* to 5*d*. The blank is delimited by an outline 71, and has four fold lines 72, 73, 74, 75 which divide the blank into three generally elliptical areas 76, 78, 80, albeit being truncated at one end, and first and second intermediate areas 77, 79. There is also a flap or tab section 81 joined by a fold line to the first intermediate area 77. After folding the blank along the fold lines, the blank is then wrapped around onto itself such that the outer elliptical areas 76 and 80 coincide or overlap, and the flap section 1 overlaps with the area 79. With the blank folded and wrapped the horn structure of FIGS. 5*a* to 5*d* is formed, and may remain in that form by gluing or fastening both the overlapping elliptical areas 76 and 80, and the overlapping flat 81 and area 79 to one another in a known manner. The elliptical area 78, and the coincident elliptical areas 76 and 80 form two opposing concave panels of the horn. These panels are joined by two opposing convex panels formed by the intermediate areas 77, 79. The curved nature of the fold lines, which convergence towards the base end, combined with the arc or sector like symmetrical shape of the overall blank produce a horn structure which is flared i.e. the cross-sectional area of the horn increases non-linearly with the distance from the throat. This improves the acoustic performance of the horn.

The first generally elliptical area may be provided as only a half elliptical area by removing a portion 76' therefrom, thus causing the edge of the blank to be delimited by line 71' in that portion of the blank.

FIG. 6 shows an alternative embodiment of the horn structure in accordance with the invention, in which the base end is symmetric. The blank for this horn structure is shown in FIG. 7, with like references referring to like features. This blank does not include the flap or tab 81 of the FIG. 8 embodiment.

It is possible to form a musical instrument, such as a kazoo, integrally with the horn. As shown in FIGS. 9*a* and 9*b,* an internal channel 100 can extend forwardly within the throat section of the horn. FIGS. 9*a* and 9*b* show the horn in a state intermediate its flat and fully constructed forms in order that the separation between the various elements can be more clearly shown. The channel comprises first and second walls 102 and 104 which are hingedly attached together along a longitudinally extending line 106. The walls 102 and 104 do not include fold lines therein. In its fully constructed state, the top of the channel 100 is defined by a further wall 108 which is composed of two wall portions 108*a* and 108*b* separated by a fold line. In the fully constructed state the walls 108*a* and 108*b* follow the same path, at least partially, as the panel 54 of the completed horn. The wall portions 108*a* and 100*b* extend immediately from the fold line 58. At the apex the walls 102 and 104 are separated from the first and second intermediate regions 77 and 79 by first and second triangular portions 112 and 114 which serve to form end walls which, in use, close the throat of the horn and ensure that air flow into the interior of the horn has to occur via the internal channel 100. One of the walls 102 and 104 of the internal channel carries a flap 116 which, in use, is adhered to the other one of the walls 102 and 104 thereby ensuring that the channel is formed. Additionally, one of the walls of the channel has an aperture or orifice formed therein for supporting a vibrating element 118 which forms the acoustically active part of the kazoo. The horn may be laminated to protect it and the laminating material, for example a plastics film, may extend over the aperture in the wall of the channel so as to form the vibrating element. In this ure and the following FIGS. 7–14 the blank is viewed from the side bearing the plastic laminate.

The arcuate crease lines 72, 73, 74, 75 impart a tension and rigidity to the walls of the horn which decreases the absorption of vibrations by the walls and enhances the application of the tapered structure as a noise maker or musical instrument.

In a further modification, panels 130 and 131 are provided to define part of the path of a glue line 150 which runs diagonally across the blank, as shown in FIG. 12. The panels 108*a* and 108*b* are also modified so as to form foldable portions 132 and 134, respectively, which lie on the path of the glue line.

In use, the end portion 140 is folded under the remainder of the horn, and the portions 132 and 134 are also folded back, thereby providing means for adhering the end portion 140 in position. The flap 138 is adhered to the corresponding portion 138*a* of the glue line. Similarly flap 136 is adhered to portion 136*a*, flap 130 to portion 130*a*, and flap 131 to portion 131*a*.

Thus the completed structure can be easily assembled, especially so when the glue line can be provided by double sided adhesive tape. The tape may be cut away in those portions where it is not overlying the blank.

Another embodiment having an adhesive line is shown in FIG. 13 in which the channel section 100 is shorter than in the embodiment of FIGS. 10 to 12, and the adhesive line 150*a* is along one edge of the blank eliminating flap 138 rather than crossing the channel section as in FIG. 12. This has advantages in the manufacture of the blank and the assembly of the tapered structure.

In FIG. 14 there is shown a variation of the internal channel structure of FIG. 13. The glue line 150*b* runs across the corner of flap 102 to create a glue area corresponding to a foldable corner 151 on flap 104*a* eliminating flap 136 from the embodiment of FIGS. 13 and 14. This simplifies construction.

Small holes 144 as shown in FIG. 11 may also be provided through which a cord or similar may be threaded (either before or after construction of the horn) to create a carrying loop, which may be a neck cord.

In FIG. 15 the blank is viewed from the unlaminated side.

As will be seen this results in a folded structure in which the flap 104*b* carries a flap 116*a* the edge of which is visible after assembly.

It is thus possible to form a structurally complex shape, comprising a kazoo and an acoustic horn from a single sheet of material, with the exclusion of the vibrating element, and only requiring three fastenings, for example by glue, to be made. Furthermore, the instrument can fold flat for easy transport.

It will be evident in view of the foregoing that various modifications may be made within the scope of the present invention. For example, there may be more than two, e.g. 3 or 4, concave elliptical panels distributed around the tubular wall member.

What is claimed is:

1. An acoustic horn comprising a tapered structure having a base end and an apex end, the tapered structure being formed from a sheet of foldable material, and comprising a wall member having a plurality of fold lines defining the edges of a plurality of juxtaposed panels, characterised in that at least two of the fold lines are arcuate to form a first non-planar panel bound by said arcuate fold lines, both the base end and the apex end being open, wherein the wall member includes a second non-planar panel, opposed to the first non-planar panel, which second non-planar panel is outwardly concave, and wherein the first and second non-planar panels are of different size from each other and one or both converge to a point proximate the base end.

2. An acoustic horn as claimed in claim 1, wherein fold lines are disposed in at least the first non-planar panel, thereby allowing the tapered structure to be folded flat.

3. An acoustic horn as claimed in claim 1, wherein the wall member includes two further opposing non-planar panels, joining the first and second non-planar panels, and being generally outwardly convex.

4. An acoustic horn as claimed in claim 1, wherein the first and second non-planar panels are generally elliptically shaped.

5. An acoustic horn as claimed in claim 1, wherein the first and second non-planar panels are generally petal-shaped.

6. An acoustic horn as claimed in claim 1, wherein first and second non-planar panels are generally trapezoidal shaped with the nonparallel sides being arcuate.

7. An acoustic horn comprising a tapered structure having a base end and an apex end, the tapered structure being formed from a sheet of foldable material, and comprising a wall member having a plurality of fold lines defining the edges of a plurality of juxtaposed panels, characterised in that at least two of the fold lines are arcuate to form a first non-planar panel bound by said arcuate fold lines, both the base end and the apex end being open, wherein the structure further comprises an internal channel withing the acoustic horn, and wherein the internal channel is integrally formed with the tapered structure.

8. An acoustic horn as claimed in claim 7, wherein the internal channel is formed by folding a portion of the sheet of foldable material.

9. An acoustic horn as claimed in claim 7, wherein at least one orifice or notch is formed in a wall of the internal channel to support a vibrating element.

10. An acoustic horn as claimed in claim 9, wherein the vibrating element is formed from one of a thin paper, plastics and metal sheet for being forced into vibration when a user modulates a flow of air into the horn.

11. An acoustic horn as claimed in claim 10, wherein the one of a thin paper, plastic and metal sheet is laminated with laminating material and the laminating material extends over the orifice or notch to form the vibrating element.

12. An acoustic horn as claimed in claim 1, wherein the tapered structure generally comprises two flat planar portions being joined at opposed edges of a flat structure.

13. An acoustic horn as claimed in claim 12, wherein a single line of adhesion is provided such that the two flat planar portions can be held together when formed from one or more sheets of foldable material.

14. An acoustic horn as claimed in claim 12, wherein the line of adhesion straight line.

15. An acoustic horn as claimed in claim 13, wherein the located along an edge of the flat structure.

16. An acoustic horn as claimed in claim 1, wherein the tapered structure comprises at least first, second and third wall portions, wherein the wall portions co-operate in use, to form a channel, and wherein the second portion, intermediate the first and third portion, is bounded by two arcuate curves, and has an outwardly concave surface.

17. A blank of foldable sheet material which has fold lines whereby the blank can be folded to the acoustic horn of claim 1.

* * * * *